United States Patent [19]

Straver

[11] Patent Number: 4,682,441
[45] Date of Patent: Jul. 28, 1987

[54] ANIMAL TRAP

[76] Inventor: William A. Straver, 3540 Vienna Dr., Aptos, Calif. 95003

[21] Appl. No.: 863,005

[22] Filed: May 14, 1986

[51] Int. Cl.⁴ .......................................... A01M 23/20
[52] U.S. Cl. ........................................................ 43/61
[58] Field of Search ....................................... 43/61, 58

[56] References Cited
U.S. PATENT DOCUMENTS

| | | | |
|---|---|---|---|
| 1,345,716 | 7/1920 | Sudul | 43/61 |
| 1,587,536 | 6/1926 | Lobit | 43/61 |
| 1,648,765 | 11/1927 | Griffin | 43/61 |
| 1,703,990 | 3/1929 | Daniels | 43/61 |
| 2,412,518 | 12/1946 | Krelwitz | 43/61 |
| 2,608,019 | 8/1952 | Smith | 43/61 |
| 2,803,918 | 8/1957 | Hall | 43/61 |
| 3,113,395 | 12/1961 | Van Kuren | 43/61 |
| 4,179,835 | 12/1979 | Hunter | 43/61 |
| 4,310,984 | 1/1982 | Brubaker | 43/61 |
| 4,342,172 | 8/1982 | Guanci | 43/61 |

FOREIGN PATENT DOCUMENTS

| | | | |
|---|---|---|---|
| 18220 | 12/1913 | Netherlands | 43/61 |
| 19439 | 8/1912 | United Kingdom | 43/61 |

Primary Examiner—M. Jordan

[57] ABSTRACT

This box-type trap has a floor, two side walls, a rear wall, and a front wall with entrance opening, with a unit consisting of a top, closing lid and a front, sliding trapdoor, the triggering mechanism, and a dividing partition with bait opening hingedly attached to the rear wall, so that when the lid is closed, the trap is divided into a front entrance compartment and a smaller rear bait compartment. A strand of string, wire or other suitable material is stretched across the bait opening and attached to a pin at the bottom of the bait opening so that the animal cannot reach the bait without either biting through the strand or dislodging it from the pin. The other end of the strand is guided through a keeper, hook or eyelets along the inside of the trap to the trapdoor, which is suspended from the strand so as to allow it to slide downward when the tension on the strand is released, closing the entrance to the trap. On the front wall is mounted a dual-purpose tension device. The lower portion of this tension device will slip over the top of the trapdor when the trap has been triggered, preventing it from re-opening; the upper portion secures the lid, keeping the top of the trap closed.

6 Claims, 5 Drawing Figures

ANIMAL TRAP

BACKGROUND OF THE INVENTION

1. Field of the Invention

This invention relates to the area of traps for animals of all sizes, and specifically to traps directed to capture animals alive and unharmed.

2. Description of the Prior Art

Previously, animal traps designed to capture animals alive have consisted of boxes fitted with gates or lids and a triggering mechanism whereby the trap would close when tripped by an animal. These earlier traps, when set, leave all or a significant part of their triggering mechanisms readily exposed to tampering or accidental tripping from the outside, either because the lid remains partially open or because a significant part of the triggering mechanism is on the outside of the trap. The features of many of these earlier traps also leave the bait open to tampering by children reaching into the trap. Many earlier traps rely on springs or fairly heavy weights to close the trap door, which, in order to close the trap securely, must close the door with sufficient force to injure the animal should a leg or tail or second animal be caught by the closing door.

SUMMARY OF THE INVENTION

This invention provides a trap which is both safe for the animal to be captured, as well other animals and children, and highly resistant to tampering by children or accidental triggering from outside the trap. It is also economical to fabricate and trouble-free to operate.

The invention consists of a box of suitable dimensions for the animal desired to be trapped, consisting of a floor, two side walls, a rear wall, and a front wall with entrance opening. A unit consisting of a top, closing lid and a front, sliding trapdoor, the triggering mechanism, and a dividing partition with bait opening is hingedly attached to the rear wall, so that when the lid is closed, the trap is divided into two compartments, a front entrance compartment and a smaller rear bait compartment. A strand of string, wire or other suitable material is stretched vertically across the bait opening and attached by a loop to a pin at the bottom of the bait opening in such a manner that the animal cannot reach the bait in the bait compartment without disturbing the strand by either biting through it or dislodging the loop from the pin. The other end of the strand is guided through a keeper, hook or eyelets along the face of the dividing partition and along the bottom side of the lid to the trapdoor, which is suspended from the strand and affixed to the front wall so as to allow it to slide downward when the tension on the strand is released, closing the entrance to the trap.

On the front wall is mounted a dual-purpose tension device. The lower portion of this tension device will slip over the top of the trapdoor, preventing it from re-opening; the upper portion secures the lid, keeping the top of the trap closed.

The trapping mechanism is of simple construction and operation and, when set, is entirely contained on the inside of the trap, making it highly resistant to tampering or accidental triggering. The bait is protected in a compartment with an opening just large enough for the animal desired to be trapped, and which is difficult to reach by children. The trapdoor closes quickly when triggered, but not with great enough force to injure the animal, in the unlikely event that it falls on a leg, tail or other body part.

DESCRIPTION OF THE PREFERRED EMBODIMENTS

Figure 1:
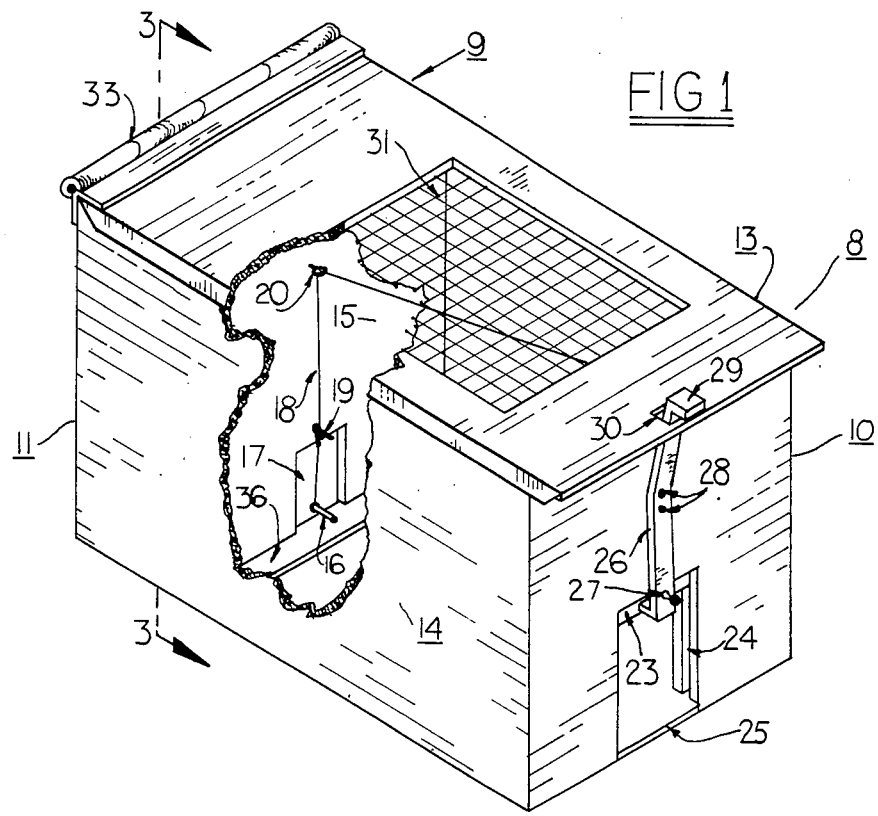
FIG. 1 is a perspective view of the invention, with cutaway showing interior parts.
Figure 2:
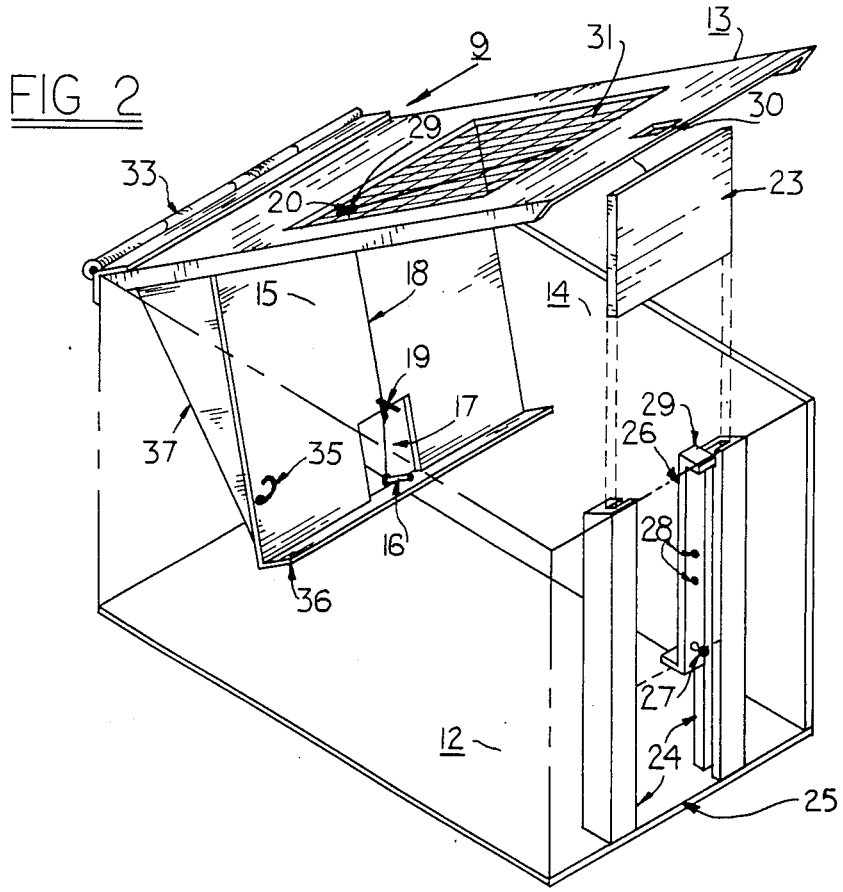
FIG. 2 is a perspective view of the invention with lid in open position.
Figure 3:
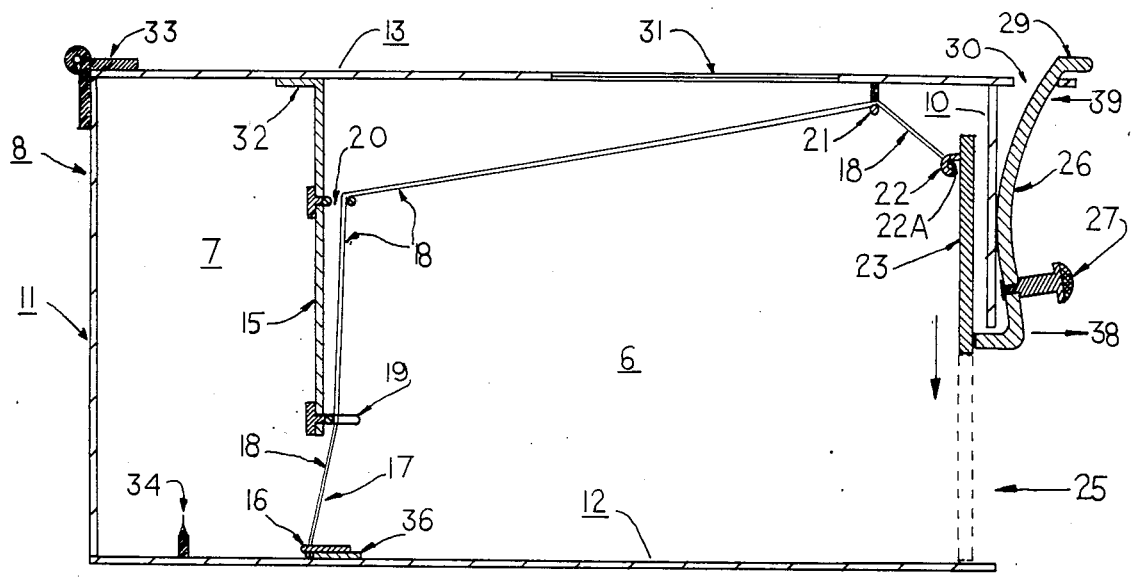
FIG. 3 is sectional view of the invention when armed.
Figure 4:
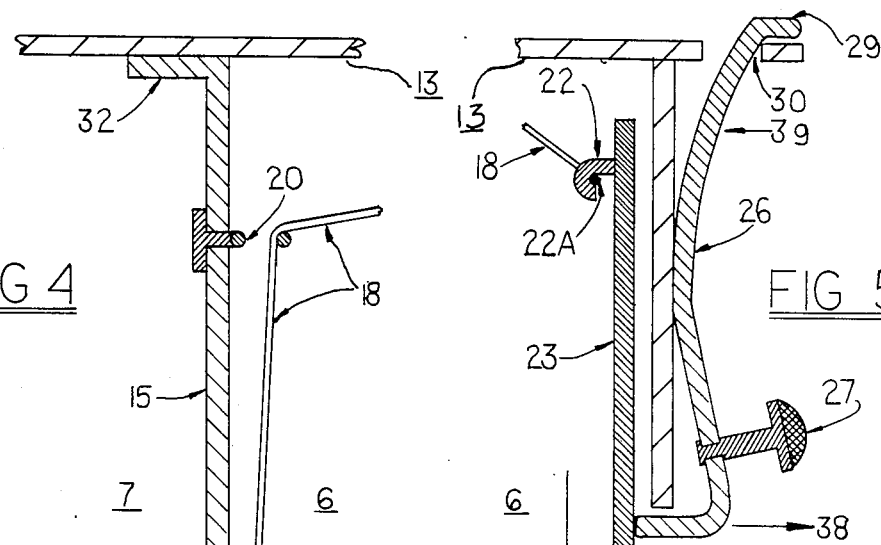
FIG. 4 is an enlarged sectional view of the dividing partition area, showing bait opening, bait pin and strand threaded through upward keeper.
Figure 5:
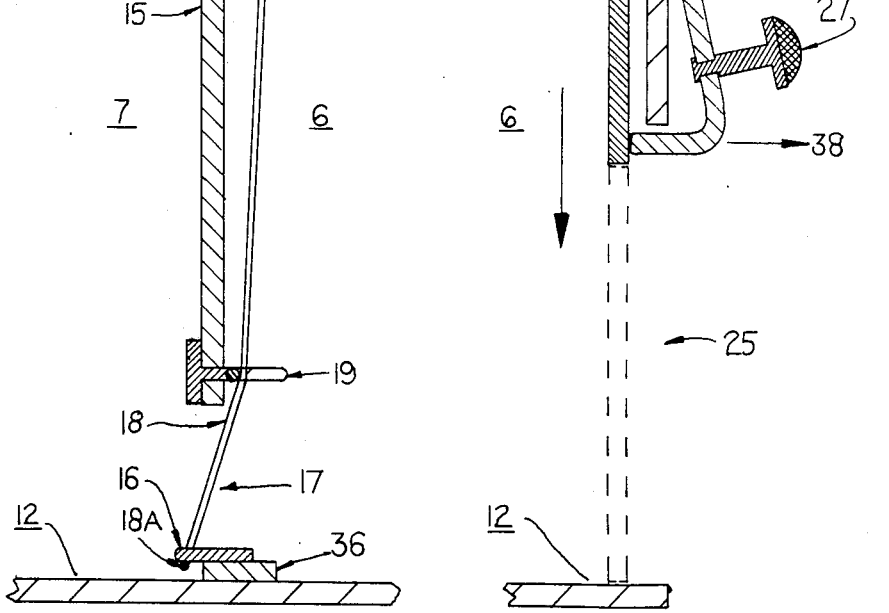
FIG. 5 is an enlarged sectional view of the front wall, showing trapdoor and tension device.

The trap consists of a box 8 of suitable dimensions for the animal desired to be trapped, consisting of a floor 12, two side walls 14, a rear wall 11, and a front wall 10 with entrance opening 25 large enough to permit the desired animal to enter freely. A unit consisting of a top, closing lid 14 and a front, sliding trapdoor 23, the triggering mechanism, described below, and a dividing partition 15 with bait opening 17 just large enough for the desired animal is attached to the rear wall 11 by means of a hinge 33, so that when the lid 14 is closed, the trap 8 is divided into two compartments, a front entrance compartment 6 and a smaller rear bait compartment 7. The triggering mechanism consists of a strand 18 of string, wire or other suitable material stretched vertically across the bait opening 17 and attached by a loop 18a to a pin 16 at the bottom of the bait opening 17 in such a manner that the animal cannot reach the bait in the bait compartment 7 without disturbing the strand by either biting through it or dislodging the loop 18a from the pin 16. The strand 18, which is preassembled to the proper length for this purpose, is then guided through a keeper 19, and hooks or eyelets 20 and 21 along the face of the dividing partition 15 and along the bottom side of the lid 13, and is affixed by a second loop 22a to a hook 22 on the trapdoor 23, which is thereby suspended from the strand 18 and inserted into two parallel channels 24 along the sides of the entrance opening 25 in the front wall 10 so as to allow the trapdoor 23 to slide downward when the tension on the strand 18 is released, closing the entrance 25 to the trap 8.

On the front wall 10 is mounted a dual-purpose tension device 26 consisting of a spring of suitable metal or plastic, attached to the front wall 10 above the entrance opening 25 by means of welding or fasteners so as to prevent the tension device 26 from rotating. The lower portion of this tension device 26 will exert slight pressure against the trapdoor when the trap is armed, and when the trap has been triggered, will slip over the top of the trapdoor 23, preventing it from re-opening, and can be released by pulling the knob 27 in the direction shown 38. The upper portion may be inserted through a rectangular hole 30 through the lid 13, securing it and keeping the top of the trap closed, and may be released by pushing in the direction shown 39.

The trap may be constructed of sheet metal, as shown in the drawings, wherein the floor 12, rear wall 11, side walls 14 and front wall 10 have been constructed of a single piece of light metal, spot welded together as one unit; and the closing lid 13 constructed of a similar piece of metal, connected to the rear wall 11 by means of a hinge 33 riveted to the lid 13 and rear wall 11, with the dividing partition 15 spotwelded to the inside of the lid 13, and supported by means of angle braces 37 at the rear side of the dividing partition 15. If constructed of opaque materials, an inspection hole 31 may be provided in the lid 13 for viewing the inside when an animal is captured.

The trap may easily be serviced, armed, or a captured animal released by exerting pressure on the upper portion of the tension device 26, thereby unlocking the lid 13, and lifting the entire unit composed of the lid 13, dividing partition 15, strand 18, keepers, hooks and eyelets 19, 20 and 21, and trapdoor 23.

When an animal enters the armed trap, it must bite through or dislodge strand 18 from the pin 16 in order to reach the bait, anchored by suitable means 34, in the bait compartment 7. When the strand 18 is severed or dislodged, the suspended trapdoor 23 will drop rapidly, guided by the two channels 24, closing opening 25 and imprisoning the animal. The lower portion of the double-purpose tension device 26 pushes slightly against the lower part of the trapdoor 23 which protrudes, when the trap is armed, below the top part of the front entrance opening 25. When the trap has been triggered and the trapdoor 23 has descended, the lower portion of the tension device 26 will slip over the top of the trapdoor 23, locking the trapdoor 23 in a closed position until released by means of a knob 27 connected to the tension device 26.

While the above contains many specificities, these should not be construed as limitations on the scope of the invention, but rather as an exemplification of one preferred embodiment thereof. Many other variations are possible, for example, construction of other materials, such as wood, wire mesh panels, or plastic, depending on the desired use, with transparent plastic being a particularly suitable material for traps designed for capturing small animals; or variation of the location of the observation hole. Accordingly, the scope of the invention should should be determined not by the embodiment illustrated, but by the appended claims and their legal equivalents.

I claim:

1. An animal trap for any size animal, comprising an enclosure of suitable dimensions for the animal desired to be captured, consisting of a floor, two side walls, a rear wall, and a front wall with entrance opening; a top, closing lid hingedly attached to the rear wall, a front, sliding trapdoor, and a dividing partition with bait opening, dividing the trap into two compartments, a front entrance compartment and a smaller rear bait compartment; a triggering mechanism entirely contained within the trap, comprised of a strand of string, wire or other suitable material stretched vertically across the bait opening and attached by a loop to a pin at the bottom of the bait opening in such a manner that the animal cannot reach the bait in the bait compartment without disturbing the strand by either biting through it or dislodging the loop from the pin, with the other end of the strand guided through a keeper, hook or eyelets along the face of the dividing partition and along the bottom side of the lid to the trapdoor; a trapdoor suspended from the strand and inserted into channels on either side of the entrance opening so as to allow it to slide downward when the tension on the strand is released by the animal severing or dislodging the strand from the pin, closing the entrance to the trap.

2. An animal trap as set forth in claim 1, wherein the lid, dividing partition and triggering mechanism comprise a single, self-contained unit.

3. An animal trap as set forth in claim 1, wherein the strand divides the bait opening into two sections, preventing the animal from entering the bait compartment without either severing or dislodging the strand from the pin.

4. An animal trap as set forth in claim 1, wherein a dual-purpose tension device is mounted on the front wall, the lower portion of which will slip over the top of the trapdoor when the trap has been triggered, preventing it from re-opening, and the upper portion of which secures the lid, keeping the top of the trap closed when the trap is armed or has been triggered.

5. An animal trap as set forth in claim 2, wherein a dual-purpose tension device is mounted on the front wall, the lower portion of which will slip over the top of the trapdoor when the trap has been triggered, preventing it from re-opening, and the upper portion of which secures the lid, keeping the top of the trap closed.

6. An animal trap as set forth in claim 1, wherein the trap is constructed out of transparent material.

* * * * *